US012801064B2

(12) United States Patent
Harada et al.

(10) Patent No.: US 12,801,064 B2
(45) Date of Patent: Nov. 17, 2026

(54) IMAGE FORMING APPARATUS HAVING COOLING UNIT FOR DEVELOPING DEVICE

(71) Applicant: KYOCERA Document Solutions Inc., Osaka (JP)

(72) Inventors: Yuzo Harada, Osaka (JP); Tomohiko Yamakawa, Osaka (JP); Kazuhisa Hirahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/316,048

(22) Filed: Sep. 2, 2025

(65) Prior Publication Data

US 2026/0072380 A1 Mar. 12, 2026

(30) Foreign Application Priority Data

Sep. 6, 2024 (JP) ................................ 2024-154171

(51) Int. Cl.
*G03G 15/08* (2006.01)
*G03G 21/16* (2006.01)
*G03G 21/20* (2006.01)

(52) U.S. Cl.
CPC ..... *G03G 15/0896* (2013.01); *G03G 21/1676* (2013.01); *G03G 21/20* (2013.01); *G03G 2221/163* (2013.01)

(58) Field of Classification Search
CPC ........... G03G 15/0896; G03G 21/1676; G03G 21/20; G03G 21/206; G03G 2215/0634; G03G 2215/0636; G03G 2215/0872; G03G 2221/163; G03G 2221/1645; H05K 7/20254; H05K 7/20336; H05K 7/20627; H05K 7/20663; H02B 1/56
USPC .......................................................... 399/119
See application file for complete search history.

(56) References Cited

U.S. PATENT DOCUMENTS 8,254,803 B2 * 8/2012 Fujiya ................ G03G 15/0896 399/119
9,921,541 B2 * 3/2018 Shimizu ............... G03G 15/095
2010/0008695 A1 * 1/2010 Okano ................... G03G 21/20 399/94
2011/0188880 A1 * 8/2011 Suzuki ............... G03G 15/0887 399/94

(Continued)

FOREIGN PATENT DOCUMENTS

JP 2012237879 A * 12/2012
JP 2017173781 A * 9/2017

(Continued)

*Primary Examiner* — Robert B Beatty
(74) *Attorney, Agent, or Firm* — Stein IP, LLC

(57) ABSTRACT

An image forming apparatus includes a developing device that develops an electrostatic latent image into a toner image and a cooling unit that cools the developing device with a cooling fluid. The cooling unit has a cooling pipe formed of a metal pipe and having an inner space of the pipe as a flow passage for the cooling fluid and a heat-dissipating member disposed between the cooling pipe and the developing device and contacting the cooling pipe and the developing device to conduct heat between the cooling pipe and the developing device. A part of the heat-dissipating member in contact with the cooling pipe is elastically deformable.

8 Claims, 10 Drawing Sheets

(56) References Cited

U.S. PATENT DOCUMENTS

| | | | | |
|---|---|---|---|---|
| 2013/0216242 | A1* | 8/2013 | Iijima | G03G 15/55 399/9 |
| 2016/0026113 | A1* | 1/2016 | Takahashi | G03G 15/065 399/285 |
| 2019/0163124 | A1* | 5/2019 | Yamashita | G03G 15/0887 |
| 2024/0345539 | A1* | 10/2024 | Son | G03G 15/0806 |

FOREIGN PATENT DOCUMENTS

| | | | | |
|---|---|---|---|---|
| JP | 2020095103 | A | * | 6/2020 |
| JP | 2020-101749 | A | | 7/2020 |
| JP | 2020101748 | A | * | 7/2020 |
| JP | 2020160218 | A | * | 10/2020 |

* cited by examiner

IMAGE FORMING APPARATUS HAVING COOLING UNIT FOR DEVELOPING DEVICE

BACKGROUND

This application is based on and claims the benefit of priority from Japanese Patent Application No. 2024-154171 filed on Sep. 6, 2024, the contents of which are hereby incorporated by reference.

The present disclosure relates to an image forming apparatus.

An image forming apparatus includes a developing device that develops an electrostatic latent image into a toner image. The image forming apparatus also includes a cooling unit that cools the developing device. The cooling unit has a circulation tube through which a cooling fluid is circulated. The developing device is cooled by heat conduction between the developing device and the circulation pipe.

SUMMARY

According to one aspect of the present disclosure, an image forming apparatus includes a developing device and a cooling unit. The developing device develops an electrostatic latent image into a toner image. The cooling unit cools the developing device with a cooling fluid. The cooling unit includes a cooling pipe and a heat-dissipating member. The cooling pipe is formed of a metal pipe and has an inner space of the pipe as a flow passage for the cooling fluid. The heat-dissipating member is disposed between the cooling pipe and the developing device, and contacts the cooling pipe and the developing device to conduct heat between the cooling pipe and the developing device. A part of the heat-dissipating member in contact with the cooling pipe is elastically deformable.

DETAILED DESCRIPTION

With reference to FIGS. 1 to 10, an image forming apparatus 100 according to an embodiment will be described taking a tandem-type color laser printer as an example. The present disclosure is not limited to color laser printers and can be equally applied to monochrome printers and multi-function peripherals.

In the diagrams referred to in the course of the following description, an XYZ orthogonal coordinate system is shown for ease of understanding. Z direction corresponds to the vertical direction, which is the up-down direction of the image forming apparatus 100. A flat surface on which the image forming apparatus 100 is installed is perpendicular to Z-direction. The arrow direction of Z-axis is the upward direction, and the opposite direction is the downward direction."

X direction is one horizontal direction and Y direction is another horizontal direction. For example, X direction corresponds to the front-back direction of the image forming apparatus 100; Y direction corresponds to the left-right direction of the image forming apparatus 100.

<Overall Configuration of an Image Forming Apparatus>

Figure 1:
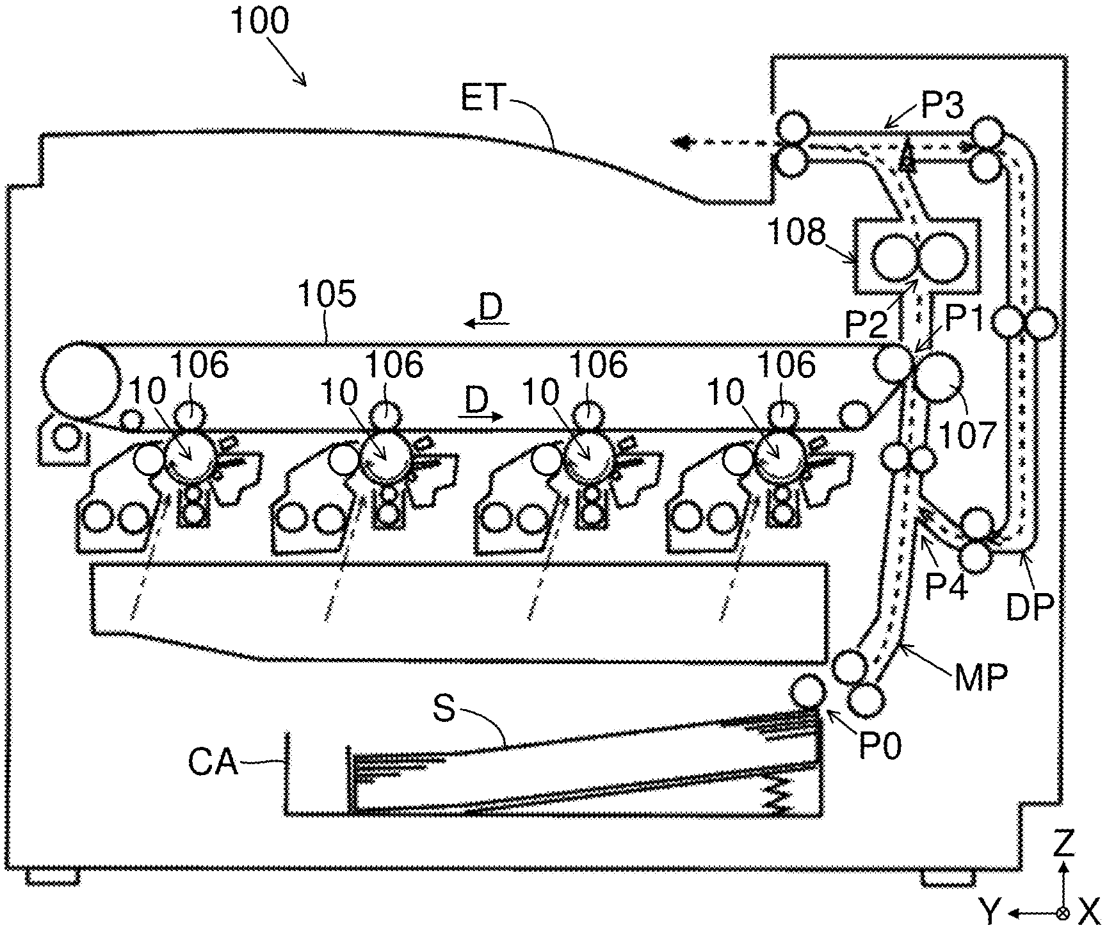
FIG. 1 is a schematic diagram of an image forming apparatus according to an embodiment.

As shown in FIG. 1, the image forming apparatus 100 according to the embodiment includes a main conveyance passage MP. The image forming apparatus 100 also includes a sheet cassette CA. The sheet cassette CA is removably mounted in the main body of the image forming apparatus 100. The sheet cassette CA stores sheets S to be used in a print job. The sheets S are fed from the sheet cassette CA to the main conveyance passage MP. The main conveyance passage MP passes from a feed position P0 for the sheets S through a transfer position P1 and a fixing position P2 in this order to reach a discharge tray ET.

In a print job, a sheet S in the sheet cassette CA is fed to the main conveyance passage MP at the feed position P0. The image forming apparatus 100 conveys the sheet S along the main conveyance passage MP. The image forming apparatus 100 then prints an image on the sheet S being conveyed. In other words, the image forming apparatus 100 transfers a toner image to the sheet S being conveyed. At the transfer position P1, a transferring process to transfer the toner image to the sheet S being transported is performed. At the fixing position P2, a fixing process to fix the toner image to the sheet S is performed.

Figure 2:
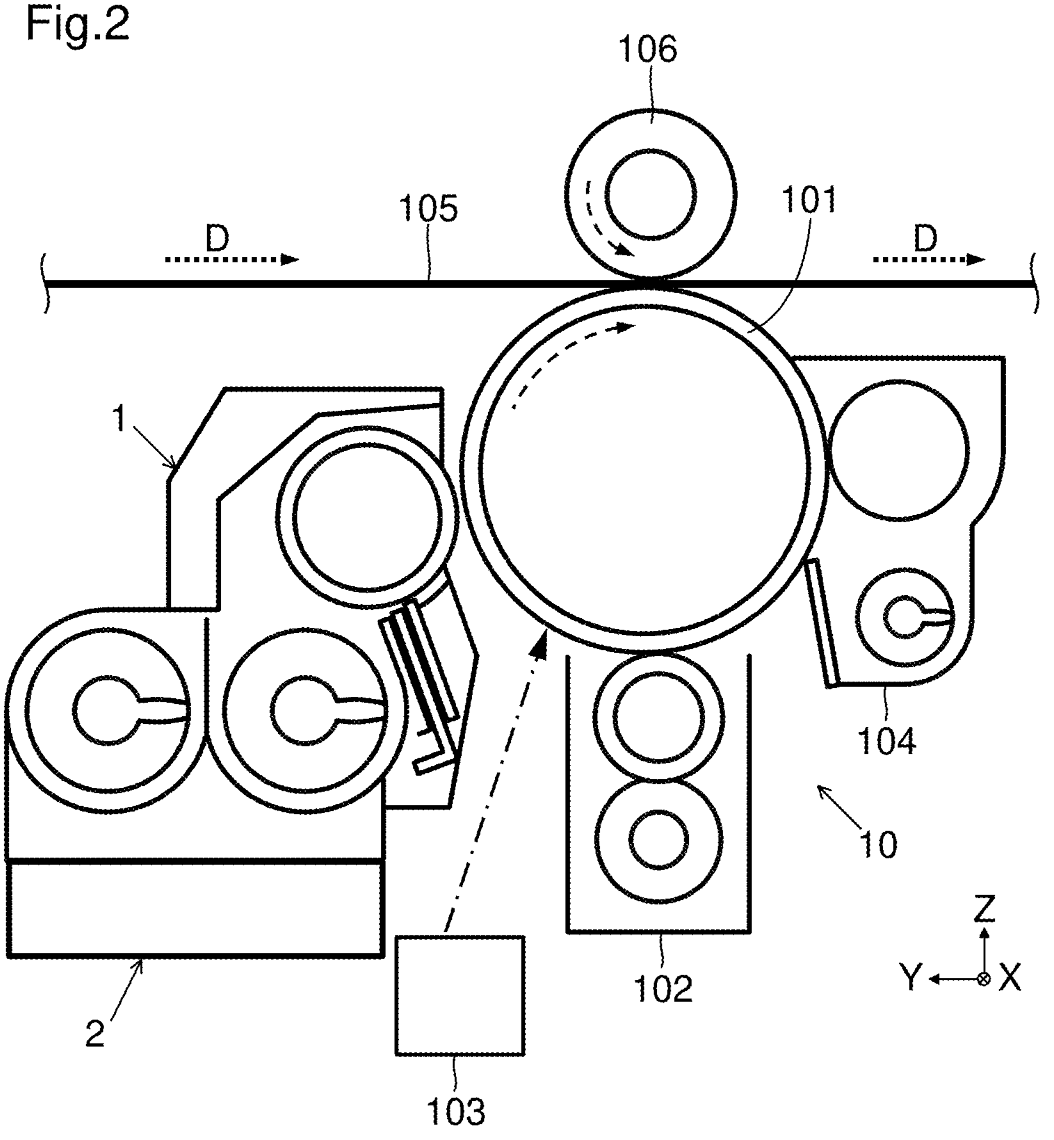
FIG. 2 is a schematic diagram around an image forming portion according to the embodiment.

The image forming apparatus 100 includes image forming portions 10 for the four colors of cyan, magenta, yellow, and black. The image forming portions 10 each form a toner image of the corresponding color. The following description will focus on the configuration of one image forming portions 10. The images forming portions 10 have basically the same configuration; accordingly, for the configuration of the other image forming portions 10, the following description is to be referred to and no overlapping description will be repeated As shown in FIG. 2, the image forming portion 10 includes a developing device 1. The image forming portion 10 also includes a photosensitive drum 101, a charging device 102, an exposure device 103, and a cleaning device 104.

During toner image formation by the image forming portion 10, the photosensitive drum 101 rotates. The charging device 102 electrostatically charges the outer circumferential surface of the photosensitive drum 101. The exposure device 103 exposes the outer circumferential surface of the photosensitive drum 101 to light to form an electrostatic latent image on the outer circumferential surface of the photosensitive drum 101. The developing device 1 feeds toner to the electrostatic latent image on the outer circumferential surface of the photosensitive drum 101 to develop the electrostatic latent image into a toner image. The cleaning device 104 removes the toner remaining on the outer circumferential surface of the photosensitive drum 101.

Here, the image forming apparatus 100 includes a cooling unit 2. The cooling unit 2 cools the developing device 1 with a cooling fluid. The cooling unit 2 will be described in detail later.

With reference back to FIG. 1, the image forming apparatus 100 includes an intermediate transfer belt 105. The intermediate transfer belt 105 is an endless belt. The intermediate transfer belt 105 contacts the outer circumferential surface of the photosensitive drum 101 and, in that state, is driven (rotates) in the direction indicated by arrow D in FIG. 1.

The image forming apparatus 100 includes a plurality of primary transfer rollers 106. The primary transfer rollers 106 are assigned one to each of the colors of cyan, magenta, yellow, and black. The primary transfer rollers 106 are disposed on the inner circumference side of the intermediate transfer belt 105. The primary transfer rollers 106 are disposed to face, across the intermediate transfer belt 105, the photosensitive drums 101 that carry toner images of the corresponding colors.

The image forming apparatus 100 includes one secondary transfer roller 107. The secondary transfer roller 107 is kept in pressed contact with the outer circumferential surface of the intermediate transfer belt 105 at the transfer position P1. The secondary transfer roller 107 forms a transfer nip with the intermediate transfer belt 105. The main conveyance passage MP passes through the transfer nip.

In a print job, a sheet S is conveyed toward the transfer position P1 (i.e., the transfer nip). The sheet S conveyed passes through the transfer nip.

To the intermediate transfer belt 105, the toner image is transferred from each photosensitive drum 101. The intermediate transfer belt 105 rotates while carrying the toner image on its outer circumferential surface. While the sheet S is passing through the transfer nip, the sheet S contacts the outer circumferential surface of the intermediate transfer belt 105. Thus, the toner image is secondarily transferred to the sheet S passing through the transfer nip.

Various rotating members, such as the photosensitive drum 101 in the image forming portion 10, rotate about an axis extending in X direction; likewise, the primary and secondary transfer rollers 106 and 107 and the like rotate about an axis extending in X direction.

The image forming apparatus 100 includes a fixing portion 108. The fixing portion 108 includes a heating roller and a pressing roller. The fixing portion 108 is disposed at the fixing position P2. The heating roller incorporates a heater. The pressure roller is kept in pressed contact with the heating roller. The heating roller and the pressure roller are kept in pressed contact with each other to form a fixing nip at the fixing position P2.

In a print job, a sheet S that has undergone the toner image transferring process passes across the fixing position P2. Thus, the sheet S is nipped in the fixing nip between the heating roller and the pressure roller. The fixing portion 108 heats the sheet S passing across the fixing position P2. At the fixing position P2, a pressure is applied to the sheet S. The fixing portion 108 heats and presses the sheet S that has undergone the toner image transferring process to fix the toner image to the sheet S. After the fixing process, the sheet S is discharged to the discharge tray ET.

The image forming apparatus 100 includes a conveyance portion, though no reference sign is assigned to it. The conveyance portion includes a pair of conveyance rollers. The pair of conveyance rollers include a pair of rollers. The pair of rollers has a conveyance nip between the rollers. The pair of conveyance rollers rotates to convey the sheet S that has entered the conveyance nip. The conveyance portion conveys the sheet S along the main conveyance passage MP. The conveyance portion conveys a sheet S also along a duplex printing conveyance passage DP, which will be described later.

The image forming apparatus 100 can perform, as a print job, not only a simplex printing job to print an image on only one side of a sheet S but also a duplex printing job to print images on both sides of a sheet S. For the duplex printing job, the image forming apparatus 100 includes a duplex printing conveyance passage DP.

The duplex printing conveyance passage DP branches off the main conveyance passage MP at a branch position P3 downstream, in the sheet conveyance direction, of the fixing position P2 along the main conveyance passage MP. The duplex printing conveyance passage DP joins the main conveyance passage MP at a junction position P4 upstream, in the sheet conveyance direction, of the transfer position P1 along the main conveyance passage MP.

When the job being performed is a simplex printing job, the sheet S passes through the transfer nip only once, and the transferring process is performed once on the sheet S passing through the transfer nip. After the first-time transferring process, the sheet S is discharged as it is to the discharged tray ET.

When the job being performed is a duplex printing job, the sheet S passes through the transfer nip twice so that the transferring process is performed once for each of the front and back sides of the sheet S. Specifically, when the sheet S passes through the transfer nip first time, the transferring process is performed on one side of the sheet S. When after the first-time transferring process the trailing end of the sheet S passes across the branch position S3, before the sheet S is completely discharged to the discharge tray ET, the sheet S is switched back. Thus, the sheet S is pulled into the duplex printing conveyance passage DP from its trailing end.

The sheet S is then conveyed along the duplex printing conveyance passage DP. Then, the sheet S in the duplex printing conveyance passage DP is returned to the main conveyance passage MP at the junction position P4. The sheet S returned to the main conveyance passage MP is conveyed along the main conveyance passage MP and passes through the transfer nip again. Here, the front and back sides of the sheet S are reversed compared with when it passed there the previous time. Thus, when the sheet S passes through the transfer nip second time, the transferring process is performed on the other side of the sheet S, which is opposite to one side of the sheet S.

<Configuration of the Developing Device>

Figure 3:
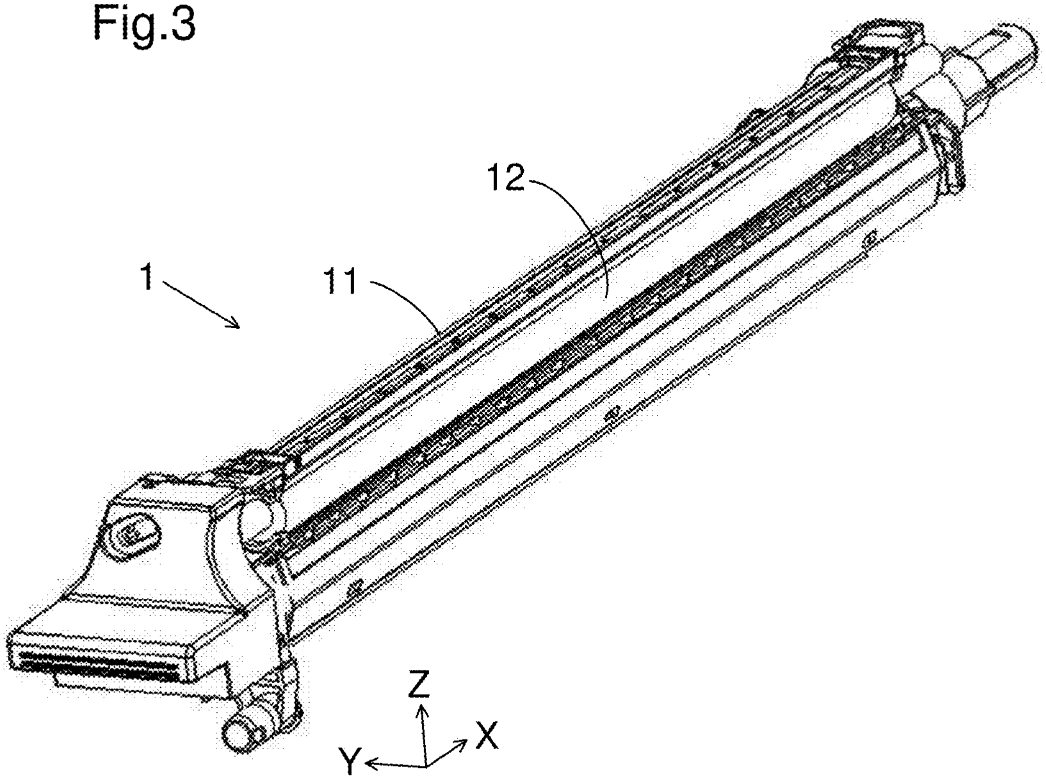
FIG. 3 is a perspective view of a developing device according to the embodiment.

Now, referring to FIGS. 3 and 4, with focus on one developing device 1, its configuration will be described. The developing devices 1 have basically the same configuration; accordingly, for the configuration of the other developing devices 1, the following description is to be referred to and no overlapping description will be repeated.

Figure 4:
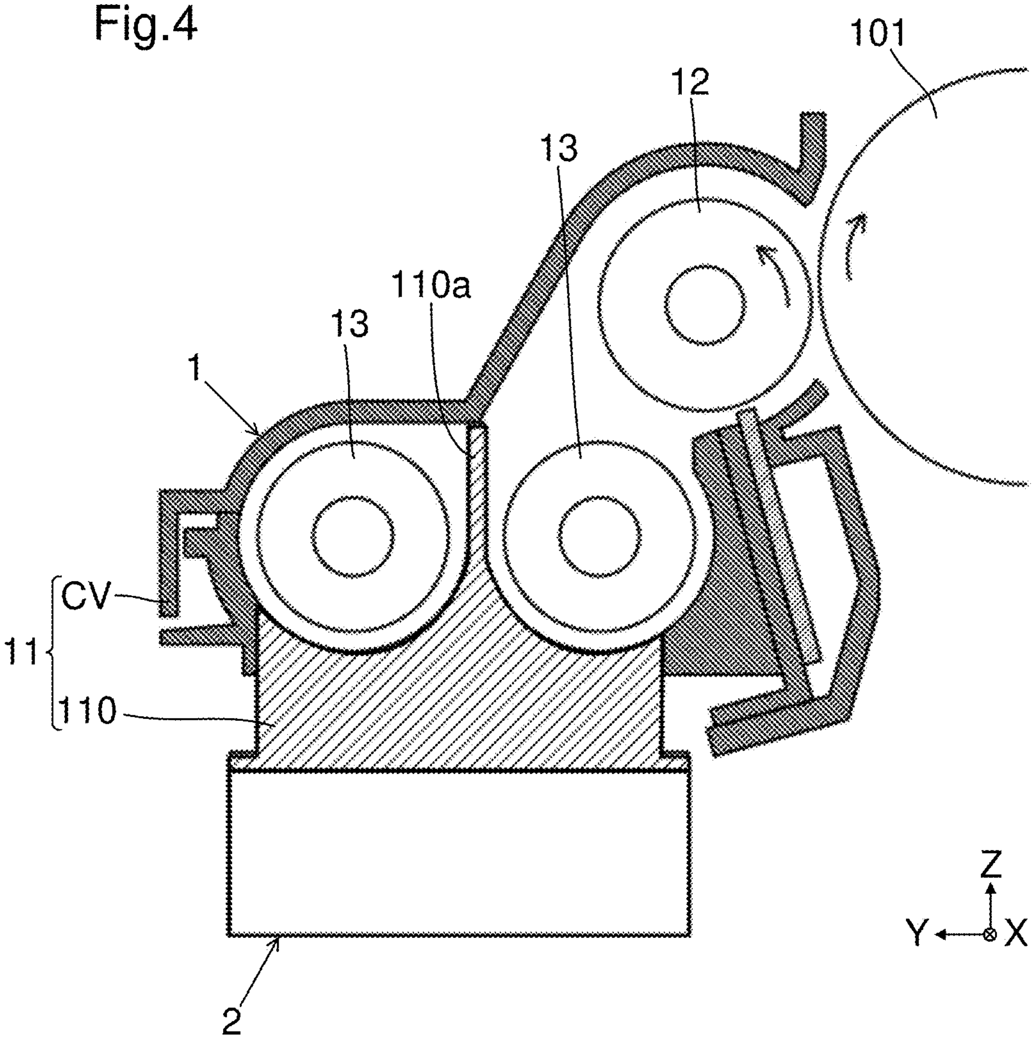
FIG. 4 is a sectional schematic diagram of the developing device according to the embodiment.
Figure 5:
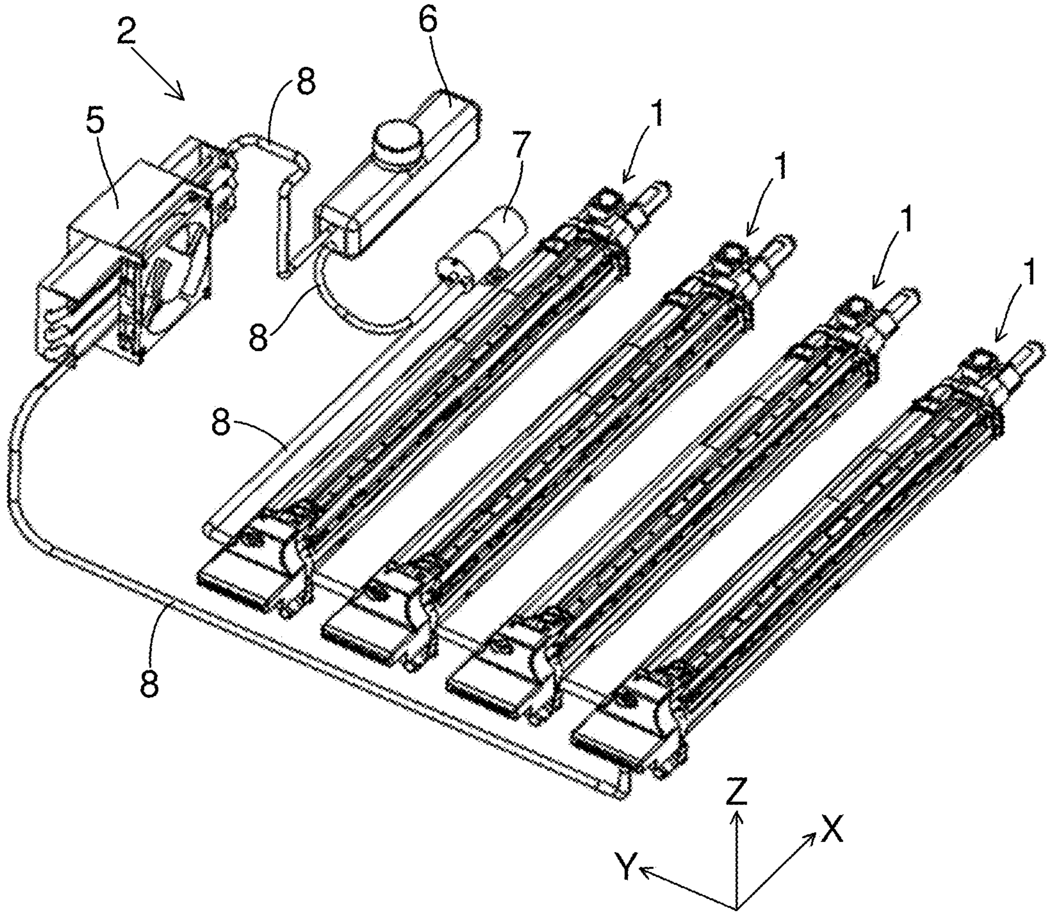
FIG. 5 is a perspective view of the developing device and a cooling unit according to the embodiment.

FIG. 4 is a sectional view of the developing device 1 cut along YZ plane. FIG. 4 schematically shows the sectional structure of the developing device 1 and does not show the actual dimensions, shapes, and the like.

The developing device 1 includes a developer container 11. The developer container 11 stores developer containing toner. The developer is, for example, a magnetic one-component developer containing a magnetic toner. The developing device 1 feeds the toner stored in the developer container 11 to the photosensitive drum 101.

The developer container 11 is a container with its longitudinal direction aligned with X direction. In other words, the developer container 11 is arranged so that its longitudinal direction is aligned with X direction. As a result, the developer container 11 extends parallel to the axis of the photosensitive drum 101.

The developing device 1 includes a developing roller 12. The developing roller 12 is disposed inside the developer container 11. The developing roller 12 is supported so as to be rotatable around an axis extending in X direction.

The developing roller 12 has part of its outer circumferential surface exposed from inside to outside the developer container 11. Specifically, the developer container 11 has an opening (no reference sign assigned) at a position opposite the photosensitive drum 101. Through this opening in the developer container 11, part of the outer circumferential surface of the developing roller 12 is exposed. Thus, the outer circumferential surface of the developing roller 12 faces the outer circumferential surface of the photosensitive drum 101. The developing roller 12 carries toner on its outer circumferential surface and feeds the toner to the electrostatic latent image on the outer circumferential surface of the photosensitive drum 101.

The developing device 1 includes two stirring screws 13. The stirring screws 13 are disposed inside the developer container 11. The stirring screws 13 are supported so as to be rotatable about an axis extending in X direction.

The stirring screws 13 have a structure in which a blade is spirally wound around its rotating shaft. The stirring screws 13, by rotating, convey the developer in X direction while stirring it. The stirring screws 13 convey the developer in opposite directions.

The developer container 11 has a container base 110. The container base 110 forms a lower part of the developer container 11. For example, the container base 110 has a partition portion 110*a* that stands upright. The partition portion 110*a* of the container base 110 divides the installation spaces for the stirring screws 13.

The developer container 11 has a container cover CV. The container cover CV is fitted to the container base 110 from above. The space enclosed by the container base 110 and the container cover CV is the storage space of the developer container 11.

The container base 110 is made of metal such as aluminum. For example, the container base 110 is formed by cutting a molded product formed by molding with a mold. On the other hand, the container cover CV is made of, for example, resin.

<Configuration of a Cooling Unit>

Now, referring to FIGS. 5 to 10, the configuration of the cooling unit 2 will be described.

The cooling unit 2 includes a cooling pipe 3. The cooling pipe 3 is a metal pipe. The material of the cooling pipe 3 is not limited, and copper, aluminum, or the like can be used. The inside space of the cooling pipe 3 serves as a flow passage for the cooling fluid. The cooling unit 2 cools the developing device 1 by passing the cooling liquid through the cooling pipe 3.

As seen in a plan view from Z direction, the cooling pipe 3 extends to one side in X direction and is on the way bent back in a curved shape to extend to the other side in X direction. In other words, the cooling pipe 3 has a shape bent substantially in a U-shape as seen in a plan view from Z direction. Thus, the cooling pipe 3 has a pair of end openings on the same side in X direction.

The cooling pipe 3 is assigned one to each of the developing devices 1. In other words, there are four cooling pipes 3. The cooling pipes 3 have the same structure. Each cooling tube 3 is disposed below the corresponding developer 1. The cooling pipe 3 cools the corresponding developing device 1.

The cooling unit 2 includes a heat-dissipating member 4. The heat-dissipating member 4 is assigned one to each of the developing devices 1. In other words, one heat-dissipating member 4 is assigned to each cooling pipe 3. The heat-dissipating member 4 is disposed, in Z direction, between the corresponding developer 1 and the cooling pipe 3 disposed below it. The heat-dissipating member 4 contacts the corresponding developing device 1 (specifically, the bottom face of the container base 110). The heat-dissipating member 4 also contacts the corresponding cooling pipe 3.

Thus, the heat-dissipating member 4 conducts heat between the corresponding developing device 1 and the cooling pipe 3 disposed below it. In other words, the developing device 1 is thermally connected to the corresponding cooling pipe 3 via the corresponding heat-dissipating member 4.

The cooling unit 2 includes a radiator 5, a tank 6, and a pump 7. The radiator 5 cools the cooling water that flows in from the cooling pipe 3. The cooling water is air-cooled by a fan. The tank 6 stores the cooling water cooled by the radiator 5. The pump 7 pumps the cooling water from the tank 6 to the cooling pipe 3. In other words, the pump 7 circulates the cooling water.

The cooling unit 2 includes a connection pipe 8. The connection pipe 8 is a silicone tube, a rubber tube, or the like and is elastic. The connection pipe 8 has an inside space that serves as a flow passage for the cooling water. The connection pipe 8 connects the radiator 5 and the tank 6, and circulates the cooling water between the radiator 5 and the tank 6. The connection pipe 8 connects together the tank 6 and the pump 7 and circulates the cooling water between the tank 6 and the pump 7.

Through the connection pipe 8, the inside space of the cooling pipe 3 communicates with the outside. With the connection pipe 8, the four cooling pipes 3 are connected in series. The end opening of the most upstream cooling pipe 3 in the cooling water circulation direction is connected to the pump 7. The end opening of the most downstream cooling pipe 3 in the cooling water circulation direction is connected to radiator 5. Thus, by being pumped by the pump 7, the cooling water in the tank 6 flows via the four cooling pipes 3 into the radiator 5, is cooled there, and returns to the tank 6. In this way, the cooling water circulates.

The cooling unit 2 includes a holding member 9. The holding member 9 is assigned one to each of the cooling pipes 3. In other words, The holding member 9 is assigned one to each of the heat-dissipating members 4. In yet other words, the holding member 9 is assigned one to each of the developing devices 1.

The cooling pipe 3 is fitted to the corresponding the holding member 9. The heat-dissipating member 4 is fitted to the corresponding the holding member 9. By being fitted to the corresponding holding member 9, the heat-dissipating member 4 covers the corresponding cooling pipe 3 from above.

The cooling unit 2 includes a pressure member 90. The pressure member 90 is assigned one to each of the holding members 9. The pressure member 90 is disposed below the corresponding the holding member 9. The pressure member 90 presses the corresponding holding member 9 upward.

This ensures that the heat-dissipating member 4 contacts the corresponding developing device 1 (the bottom face of its container base 110).

The pressing member 90 includes a pressing segment and a compression coil spring, though not shown. The pressure strip contacts the bottom face of the corresponding holding member 9. The compression coil spring exerts an urging force to urge the pressure strip upward.

Figure 6:
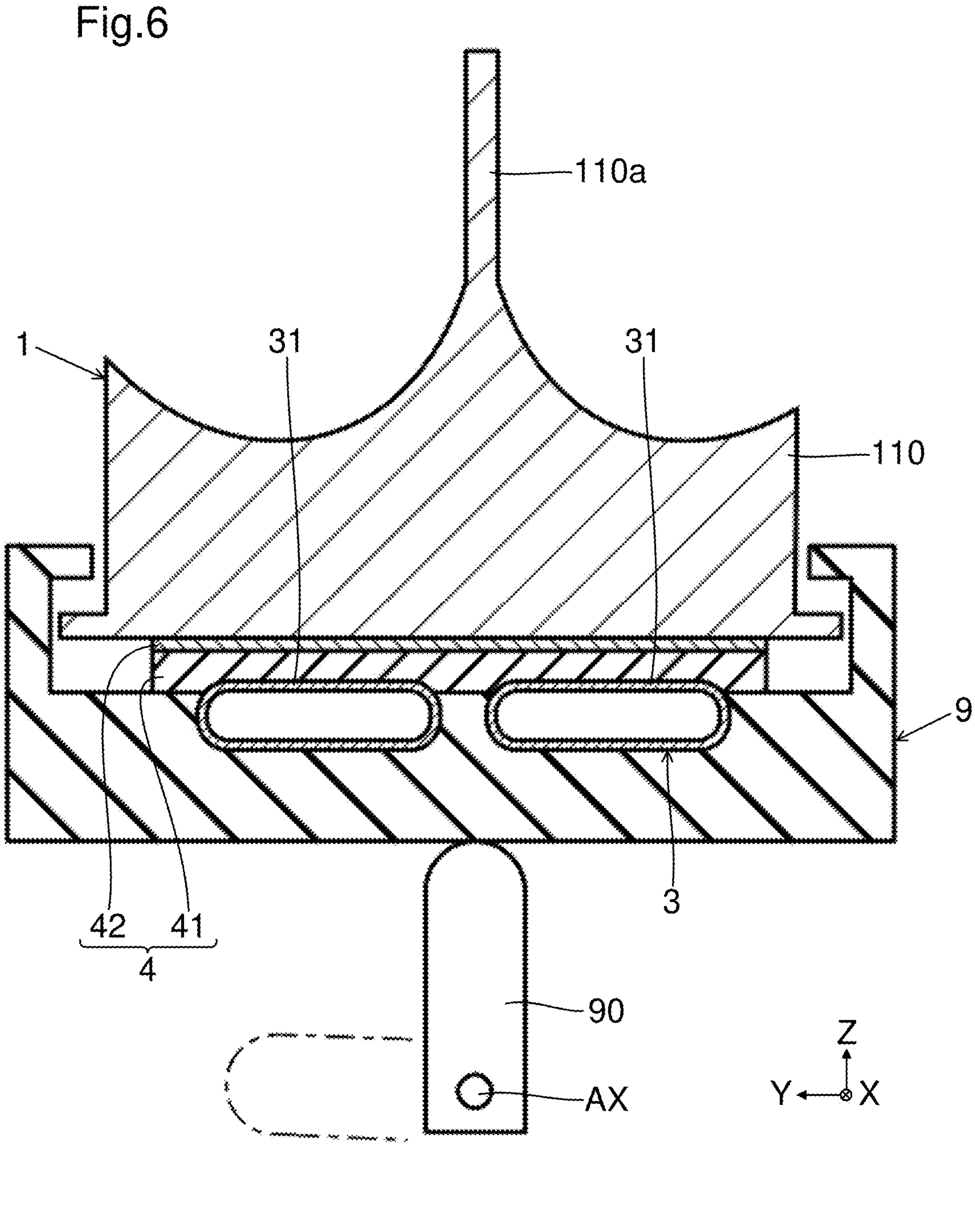
FIG. 6 is a sectional schematic diagram of the cooling unit according to the embodiment.
Figure 7:
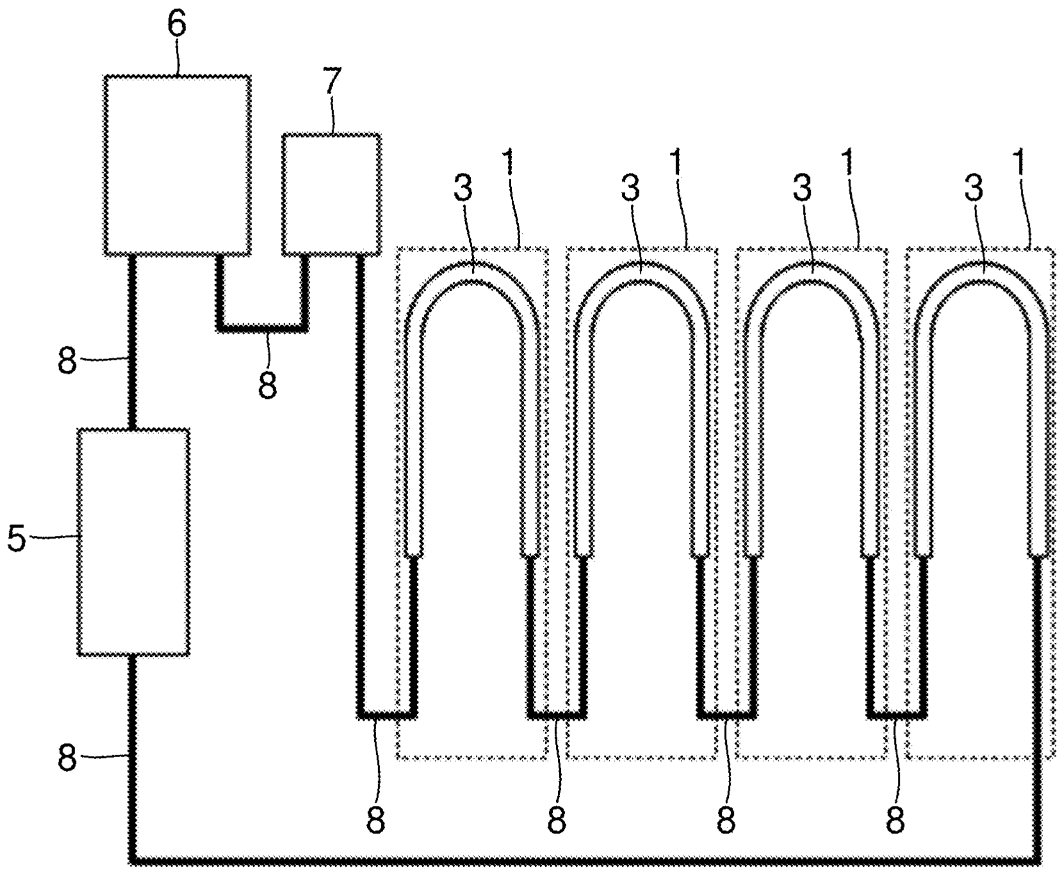
FIG. 7 is a schematic diagram of a flow passage of the cooling unit according to the embodiment.

The pressure member 90 is rotatable about an axis AX extending in X direction. By rotating about the axis AX, the pressure member 90 is disposed either in a pressing position or in a released position. FIG. 6 shows the pressure member 90 disposed in the pressing position, and part of the outer shape of the pressure member 90 when disposed in the released position is indicated by a dash-and-dot line.

When disposed in the pressing position, the pressure member 90 presses the corresponding holding member 9 upward. When disposed in the released position, the pressure member 90 releases from its pressure the corresponding holding member 9.

For example, the image forming apparatus 100 has a main body cover (not shown) that covers the inside of the main body. The main body cover can be opened and closed. From the closed state, the main body cover is displaced in one direction about a predetermined axis to be in the open state, exposing the inside of the main body. From the open state, the main body cover is displaced in the other direction around the predetermined axis to be in the closed state, covering the inside of the main body. When opened, the main body cover exposes the developing devices 1. When closed, the main body cover covers the developing devices 1.

The pressing member 90 pivots about an axis AX as a fulcrum as the main body cover opens and closes. The pressing member 90 is displaced from the pressing position toward the released position as the main body cover is opened. The pressing member 90 is displaced from the released position toward the pressing position as the main body cover is closed.

Thus, with the main body cover closed, the pressing member 90 presses the corresponding holding member 9 upward. With the main body cover opened, the pressing member 90 releases from its pressure the corresponding holding member 9.

Here, the developing device 1 is removably mounted in the main body of the image forming apparatus 100. The developing device 1 can be removed from the main body of the image forming apparatus 100 by being pulled out of it in X direction. The developing device 1 can be mounted in the main body of the image forming apparatus 100 by being inserted into it in X direction.

When any of the developing devices 1 (herein referred to as the target developing device 1) is mounted or removed, opening the main body cover releases the holding members 9 from upward pressing. Thus, in any of the developing devices 1 including the target developing device 1, the pressure in Z direction from the corresponding heat radiation member 4 reduces. In other words, in any of the developing device 1 including the target developing device 1, the contact pressure against the corresponding heat radiation member 4 reduces. This allows the target developer device 1 to be pulled out of or inserted into the main body of the image forming apparatus 100.

<Cooling Pipes>

Figure 8:
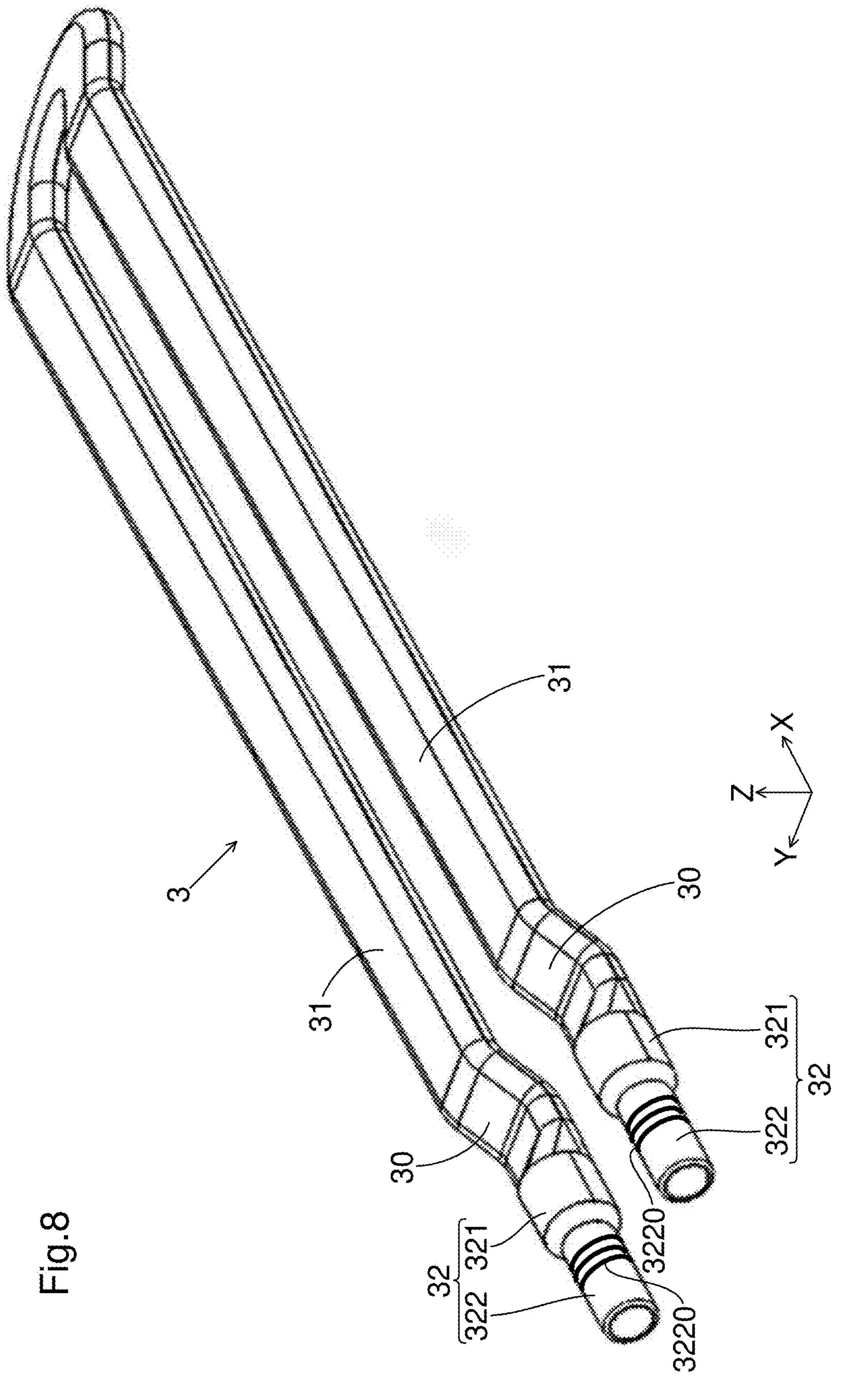
FIG. 8 is a perspective view of a cooling pipe according to the embodiment.
Figure 9:
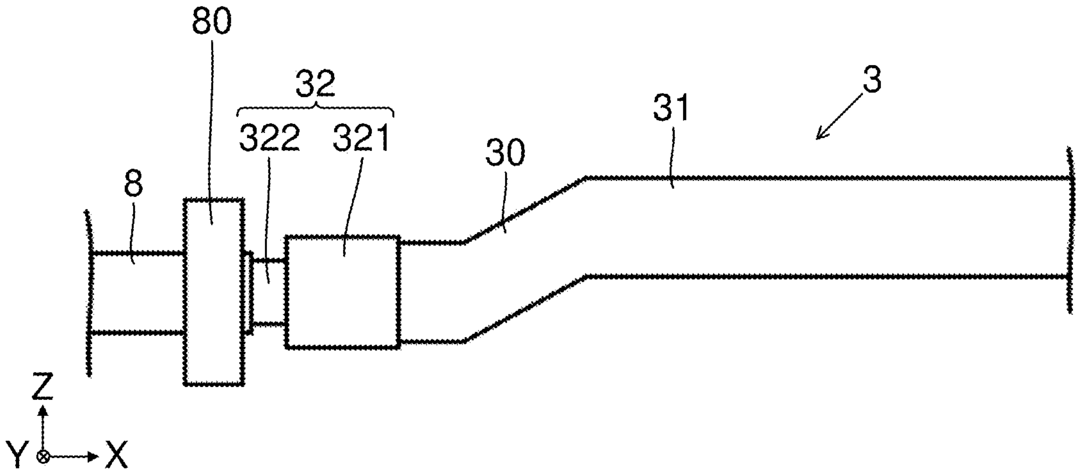
FIG. 9 is a side view around a connection portion of the cooling pipe according to the embodiment.

Now, referring to FIGS. 8 and 9, with focus on one cooling pipe 3, its structure will be described. The cooling pipes 3 have basically the same structure; accordingly, for the structure of the other cooling pipes 3, the following description is to be referred to and no overlapping description will be repeated.

The cooling pipe 3 has a heat-receiving portion 31. The part of the cooling pipe 3 other than end parts of it in its extension direction and the U-shaped curved part of it is the heat-receiving part 31. Of the cooling pipe 3, at least the heat-receiving portion 31 contacts the heat-dissipating member 4.

The cooling pipe 3 has a connection portion 32. Opposite end parts of the cooling pipe 3 in its extension direction are each a connection portion 32. The connection portion 32 is inserted in the connection tube 8. Thus, the connection portion 32 is connected to the connection pipe 8. For example, with the connection portion 32 inserted in the connection pipe 8, the connection pipe 8 is secured to the connection portion 32 with a connecting member 80 like a cable tie.

Here, in this embodiment, the heat-receiving portion 31 is flat in the direction (Z direction) in which it faces the developing device 1 across the heat-dissipating member 4. The heat-receiving portion 31 has a pair of flat portions facing each other in Z direction as seen in a sectional view cut across a plane orthogonal to the extension direction of the cooling pipe 3. In other words, the heat-receiving portion 31 has a substantially oval outline of which the minor-axis direction is aligned with Z direction as seen in in a sectional view cut across a plane orthogonal to the extension direction of the cooling pipe 3.

For example, pressing a metal circular pipe as the material of the cooling pipe 3 flattens the part of the circular pipe that serves as the heat-receiving portion 31. Opposite end parts of the circular pipe in its extension direction (i.e., the parts that serve as the connection portion 32) are cylindrical.

In this embodiment, flattening the cooling pipe 3 in Z direction increases the contact area between the cooling pipe 3 and the heat dissipation member 4 even if the cooling pipe 3 is a metal pipe (in other words, even if the cooling pipe 3 does not deform elastically). This helps improve heat conductivity between the developing device 1 and the cooling pipe 3 through the heat-dissipating member 4. Thus, it is possible to cool the developing device 1 efficiently.

For example, if a rubber tube, a silicone tube, or the like is used as the cooling pipe 3, constricting the cooling pipe 3 in Z direction flattens it elastically. Thus, if a rubber tube, a silicone tube, or the like is used as the cooling pipe 3, the contact area between the cooling pipe 3 and the heat dissipating member 4 can be increased. However, rubber, silicone, and similar tubes have lower thermal conductivity than metal pipes.

Thus, in this embodiment, a metal pipe is used as the cooling pipe 3 and the metal pipe is flattened in Z direction. This helps improve the cooling effect for the developing device 1 as compared with when a rubber tube, a silicone tube, or the like is used as the cooling pipes 3.

As a modified example, the heat-dissipating member 4 need not be interposed between the developing device 1 and the cooling pipe 3. In other words, the developing device 1 (the bottom face of its container base 110) and the cooling pipe 3 can contact each other directly. With this configuration, if the cooling pipe 3 is a circular pipe, the contact area between the developing device 1 and the cooling pipe 3 is small. However, if the cooling pipe 3 is a flat pipe, the contact area between the developing device 1 and the cooling pipe 3 is larger than if the cooling pipe 3 is a circular pipe. In other words, flattening the cooling pipe 3 in Z direction helps enhance the cooling effect for the developing device 1 without using the heat dissipating member 4.

In this embodiment, a boundary portion 30 of the cooling pipe 3 between the heat receiving portion 31 and the connection portion 32 is bent. The boundary portion 30 slopes obliquely downward from the boundary with the heat-receiving portion 31 toward the boundary with the connection portion 32. In other words, the boundary portion 30 slopes to be increasingly far away from the developing device 1 (i.e., the heat dissipating member 4) from the boundary with the heat receiving portion 31 toward the boundary with the connection portion 32.

In this embodiment, the boundary portion 30 of the cooling pipe 3 between the heat receiving portion 31 and the connection portion 32 is bent, so that the connection portion 32 is disposed below the heat receiving portion 31. In other words, the connection portion 32 is disposed farther away from the developing device 1 (i.e., the heat-dissipating member 4) than the heat-receiving portion 31.

If the boundary portion 30 is not bent, a part of the connecting member 80 disposed where the connection portion 32 of the cooling pipe 3 and the connection pipe 8 are connected together protrudes above the heat-receiving portion 31. This causes the heat-dissipating member 4 to be lifted up above the cooling pipe 3 and leaves a part of the heat-receiving portion 31 out of contact with the heat-dissipating member 4.

On the other hand, in this embodiment, the connecting member 80 can be prevented from protruding above the heat-receiving portion 31. This ensures that the heat-receiving portion 31 makes contact with the heat-dissipating member 4.

In this embodiment, the connection portion 32 has a large diameter portion 321 and a small diameter portion 322. The large diameter portion 321 is a portion on the boundary portion 30 side. The small diameter portion 322 is a portion on the side opposite from the boundary portion 30 (i.e., a tip portion), with a smaller outer diameter than the large-diameter portion 321. The connection portion 32 is inserted into the connecting pipe 8 with the large-diameter portion 321 left out. Only the small-diameter portion 322 of the connection portion 32 is inserted into the connection pipe 8 to achieve connection between the connection portion 32 and the connection pipe 8.

This ensures that, even with the connection portion 32 (specifically, the small diameter portion 322) inserted in the connection pipe 8 and the connection pipe 8 fixed to the connection portion 32 with the connecting member 80, no part of the connecting member 80 protrudes above the heat receiving portion 31.

In this embodiment, knurled grooves 3220 are formed in the outer circumferential surface of the small-diameter portion 322. The knurled grooves 3220 extend in the circumferential direction of the small-diameter portion 322. The small diameter portion 322 has a plurality of knurled grooves 3220 in its outer circumferential surface. This prevents the connection tube 8 from coming off the small diameter portion 322.

In this embodiment, the cooling pipe 3 has a substantially U-shape as seen in a plan view from Z direction. It is thus easy to secure a large contact area between the cooling pipe 3 and the heat-dissipating member 4.

<Heat Dissipating Members>

Figure 10:
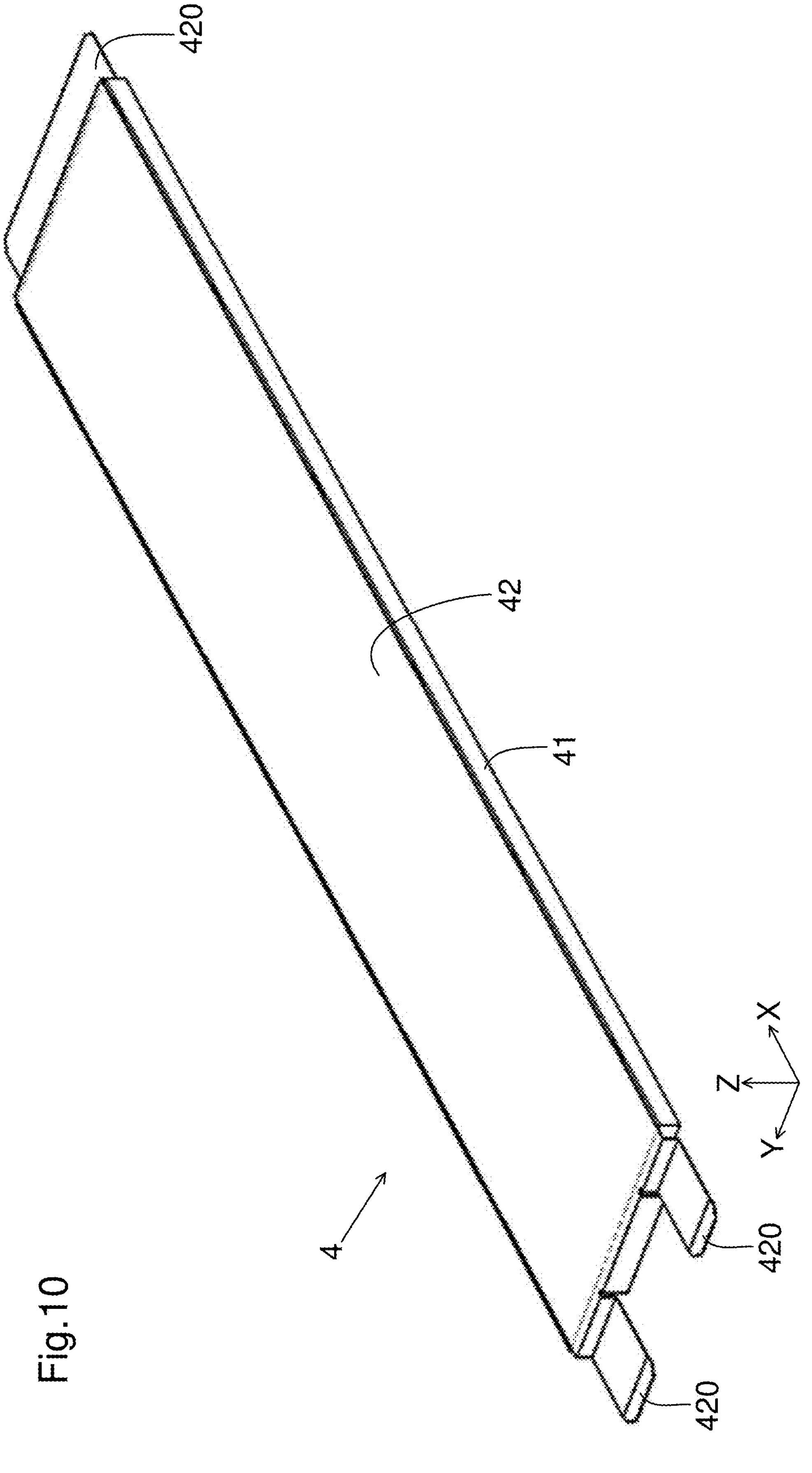
FIG. 10 is a perspective view of a heat dissipating member according to the embodiment.

Now, referring to FIG. 10, with focus on one heat-dissipating member 4, its structure will be described. The heat-dissipating members 4 have basically the same structure; accordingly, for the structure of the other heat-dissipating members 4, the following description is to be referred to and no overlapping description will be repeated.

In this embodiment, the heat-dissipating member 4 has an elastically deformable portion. Of the heat-dissipating member 4, at least a part that contacts the cooling pipe 3 is elastically deformable. Specifically, the heat-dissipating member 4 includes a first sheet 41 and a second sheet 42. The first sheet 41 contacts the cooling pipe 3. The second sheet 42 contacts the developing device 1 (specifically, the bottom face of the container base 110). In this structure, the first sheet 41 is elastically deformable.

Thus, in this embodiment, when the cooling pipe 3 and the heat-dissipating member 4 are brought into contact with each other, even if the outer circumferential surface of the cooling pipe 3 is uneven, the first sheet 41 elastically deforms to fit the shape of the outer circumferential surface of the cooling pipe 3 and thereby secures a larger contact area between the cooling pipe 3 and the heat-dissipating member 4. The larger contact area between the cooling pipe 3 and the heat-dissipating member 4 enhances the heat conductivity between the developing device 1 and the cooling pipe 3 through the heat-dissipating member 4. This helps cool the developing device 1 efficiently.

In this embodiment, the first sheet 41 is more easily elastically deformable than the second sheet 42. This makes it easy for the first sheet 41 to elastically deform to fit the shape of the outer circumferential surface of the cooling pipe 3. In other words, it is easy to secure a larger contact area between the cooling pipe 3 and the heat-dissipating member 4.

On the other hand, in this embodiment, the second sheet 42 is more slidable than the first sheet 41. Thus, when any of the developing devices 1 (herein referred to as the target developing device 1) is mounted in or removed from the main body of the image forming apparatus 100, even if the target developing device 1 (the bottom face of its container base 110) and the heat-dissipating member 4 are in contact, the target developing device 1 can be smoothly pulled out or inserted in with small resistance.

In this embodiment, the first sheet 41 is a silicone sheet. It is thus easy to make the first sheet 41 elastic without compromising the thermal conductivity of the first sheet 41. The second sheet 42 is a metal sheet. The second sheet 42 can be formed of a material such as copper, aluminum, or stainless steel. It is thus easy to make the second sheet 42 more slidable without compromising the thermal conductivity of the second sheet 42. Also, being a silicone sheet, the first sheet 41 secures insulation between the developing device 1 and the cooling pipe 3.

In this embodiment, the second sheet 42 covers the first sheet 41 from above. The second sheet 42 has a mounting portion 420 that protrudes beyond the first sheet 41 in X direction (i.e., a direction orthogonal to the direction facing the developing apparatus 1). With the first sheet 41 covered from above by the second sheet 42, the mounting portion 420 is attached to the holding member 9. Thus, attaching the second sheet 42 to the holding member 9 permits the first sheet 41 to be fixed to the holding member 9.

The embodiments disclosed herein should be understood to be in every aspect illustrative and not restrictive. The scope of the present disclosure is defined not by the description of the embodiments given above but by the appended claims, and encompasses any modifications within a scope equivalent in significance to that of those claims.

What is claimed is:

1. An image forming apparatus comprising:

a developing device that develops an electrostatic latent image into a toner image; and a cooling unit that cools the developing device with a cooling fluid, wherein the cooling unit includes:

a cooling pipe that is formed of a metal pipe and that has an inner space of the pipe as a flow passage for the cooling fluid; and a heat-dissipating member that is disposed between the cooling pipe and the developing device, the heat-dissipating member making contact with the cooling pipe and the developing device to conduct heat between the cooling pipe and the developing device, and a part of the heat-dissipating member in contact with the cooling pipe is elastically deformable.

2. The image forming apparatus according to claim 1, wherein the heat dissipating member includes:

a first sheet in contact with the cooling pipe; and a second sheet in contact with the developing device, the first sheet is more easily elastically deformable than the second sheet, and the second sheet is more slidable than the first sheet.

3. The image forming apparatus according to claim 2, wherein the first sheet is a silicone sheet, and the second sheet is a metal sheet.

4. The image forming apparatus according to claim 1, wherein the cooling pipe has a shape bent in a U-shape.

5. The image forming apparatus according to claim 1, wherein the cooling pipe has a heat-receiving portion that contacts the heat-dissipating member, and the heat-receiving portion is flat in a direction in which it faces the developing device across the heat-dissipating member.

6. The image forming apparatus according to claim 5, wherein the cooling unit includes a connection pipe through which the inner space of the cooling pipe communicates with outside, the cooling pipe has an end part of the cooling pipe in an extension direction thereof as a connection portion, the connection portion is connected to the connection pipe by being inserted into the connection pipe, and a boundary portion of the cooling pipe between the heat-receiving portion and the connection portion is bent so that the connection portion is disposed farther away from the developing device than the heat-receiving portion.

7. The image forming apparatus according to claim 6, wherein the connection portion is cylindrical, the connection portion has a large-diameter portion which is a portion on a boundary portion side, and a small-diameter portion which is a portion on a side opposite from the boundary portion and which has a smaller outer diameter than the large-diameter portion, wherein inserting the small-diameter portion into the connection pipe results in the connecting portion being connected to the connection pipe.

8. The image forming apparatus according to claim 7, wherein the small-diameter portion has in an outer circumferential surface thereof a knurled groove extending in a circumferential direction of the small diameter portion.

* * * * *